US010937173B2

United States Patent
Ali Akbarian et al.

(10) Patent No.: US 10,937,173 B2
(45) Date of Patent: Mar. 2, 2021

(54) PREDICTING SUBJECT BODY POSES AND SUBJECT MOVEMENT INTENT USING PROBABILISTIC GENERATIVE MODELS

(71) Applicant: QUALCOMM Incorporated, San Diego, CA (US)

(72) Inventors: Mohammad Sadegh Ali Akbarian, Amsterdam (NL); Amirhossein Habibian, Amsterdam (NL); Koen Erik Adriaan Van De Sande, Breukelen (NL)

(73) Assignee: Qualcomm Incorporated, San Diego, CA (US)

(*) Notice: Subject to any disclaimer, the term of this patent is extended or adjusted under 35 U.S.C. 154(b) by 289 days.

(21) Appl. No.: 16/192,260

(22) Filed: Nov. 15, 2018

(65) Prior Publication Data
US 2020/0160535 A1    May 21, 2020

(51) Int. Cl.
| | |
|---|---|
| *G06T 7/20* | (2017.01) |
| *G06K 9/00* | (2006.01) |
| *G06N 5/04* | (2006.01) |
| *G06N 3/08* | (2006.01) |
| *G06N 7/00* | (2006.01) |

(52) U.S. Cl.
CPC ............ *G06T 7/20* (2013.01); *G06K 9/00791* (2013.01); *G06N 3/08* (2013.01); *G06N 5/046* (2013.01); *G06N 7/00* (2013.01); *G06T 2207/20081* (2013.01)

(58) Field of Classification Search
CPC ............. G06T 7/20; G06T 2207/20081; G06T 2207/30196; G06T 2207/20084; G06T 7/251; G06T 7/75; G06K 9/00791; G06K 9/6262; G06K 9/6273; G06K 9/6296;
(Continued)

(56) References Cited

U.S. PATENT DOCUMENTS

| | | | |
|---|---|---|---|
| 10,210,382 B2* | 2/2019 | Shotton | G06F 3/017 |
| 10,474,876 B2* | 11/2019 | Segawa | G06K 9/00288 |

(Continued)

OTHER PUBLICATIONS

Choutas V., et al., "PoTion: Pose MoTion Representation for Action Recognition," IEEE Conference on Computer Vision and Pattern Recognition, Jun. 2018, pp. 1-10. Retrieved from the URL: https://hal.inria.fr/hal-01764222/document.

*Primary Examiner* — Wesley J Tucker
(74) *Attorney, Agent, or Firm* — Patterson & Sheridan, L.L.P

(57) ABSTRACT

Certain aspects of the present disclosure are directed to methods and apparatus for predicting subject motion using probabilistic models. One example method generally includes receiving training data comprising a set of subject pose trees. The set of subject pose trees comprises a plurality of subsets of subject pose trees associated with an image in a sequence of images, and each subject pose tree in the subset indicates a location along an axis of the image at which each of a plurality of joints of a subject is located. The received training data may be processed in a convolutional neural network to generate a trained probabilistic model for predicting joint distribution and subject motion based on density estimation. The trained probabilistic model may be deployed to a computer vision system and configured to generate a probability distribution for the location of each joint along the axis.

30 Claims, 12 Drawing Sheets

(58) Field of Classification Search
CPC .......... G06K 9/00369; G06K 9/00342; G06N 5/046; G06N 3/08; G06N 7/00
See application file for complete search history.

(56) References Cited

U.S. PATENT DOCUMENTS

| | | | |
|---|---|---|---|
| 10,474,908 B2* | 11/2019 | Levi | G06T 7/11 |
| 10,535,174 B1* | 1/2020 | Rigiroli | G06T 13/40 |
| 10,796,482 B2* | 10/2020 | Ge | G06T 7/50 |
| 2013/0230211 A1* | 9/2013 | Tanabiki | G06T 7/75 |
| | | | 382/103 |
| 2013/0271458 A1* | 10/2013 | Andriluka | G06T 7/55 |
| | | | 345/420 |
| 2019/0108400 A1* | 4/2019 | Escorcia | G06K 9/6215 |
| 2019/0147292 A1* | 5/2019 | Watanabe | G06F 16/7335 |
| | | | 382/103 |
| 2020/0304804 A1* | 9/2020 | Habibian | H04N 19/117 |

* cited by examiner

PREDICTING SUBJECT BODY POSES AND SUBJECT MOVEMENT INTENT USING PROBABILISTIC GENERATIVE MODELS

FIELD OF THE DISCLOSURE

The present disclosure generally relates to artificial neural networks and, more particularly, to using probabilistic generative models in an artificial neural network to predict subject body poses and subject movement intent.

DESCRIPTION OF RELATED ART

An artificial neural network, which may be composed of an interconnected group of artificial neurons (e.g., neuron models), is a computational device or represents a method performed by a computational device. These neural networks may be used for various applications and/or devices, such as Internet Protocol (IP) cameras, Internet of Things (IoT) devices, autonomous vehicles, and/or service robots.

Convolutional neural networks are a type of feed-forward artificial neural network. Convolutional neural networks may include collections of artificial neurons that each have a receptive field and that collectively tile an input space. Convolutional neural networks (CNNs) have numerous applications. In particular, CNNs have broadly been used in the area of pattern recognition and classification.

In layered neural network architectures, the output of a first layer of artificial neurons becomes an input to a second layer of artificial neurons, the output of a second layer of artificial neurons becomes an input to a third layer of artificial neurons, and so on. Convolutional neural networks may be trained to recognize a hierarchy of features. Computation in convolutional neural network architectures may be distributed over a population of processing nodes, which may be configured in one or more computational chains. These multi-layered architectures may be trained one layer at a time and may be fine-tuned using back propagation. Advances in technology have resulted in smaller and more powerful computing devices. The prevalence of these computing devices is driven in part by the many functions that are now enabled on such devices. Demand for such functions increases processing capability requirements and, in some cases, generates a need for more powerful batteries. Within the limited space of the housing of these computing devices, batteries compete with the processing circuitry. These and other factors contribute to a continued miniaturization of components within the circuitry.

BRIEF SUMMARY

Certain aspects of the present disclosure are directed to a method for predicting subject motion. The method generally includes receiving training data comprising a set of subject pose trees, wherein the set of subject pose trees comprises a plurality of subsets of subject pose trees, wherein each subset of subject pose trees is associated with an image in a sequence of images, and wherein each subject pose tree in the subset is associated with an axis of the image and indicates a location along the axis of the image at which each of a plurality of joints of a subject is located; processing the received training data in a convolutional neural network to generate a trained probabilistic model for predicting joint distribution and subject motion based on density estimation; and deploying the trained probabilistic model to a computer vision system, wherein the trained probabilistic model is configured to generate a probability distribution for each joint, the probability distribution indicating a likelihood that the joint will be located at each location along the axis.

Certain aspects of the present disclosure are directed to an apparatus for predicting subject motion. The apparatus generally includes at least one processor configured to receive training data comprising a set of subject pose trees, wherein the set of subject pose trees comprises a plurality of subsets of subject pose trees, wherein each subset of subject pose trees is associated with an image in a sequence of images, and wherein each subject pose tree in the subset is associated with an axis of the image and indicates a location along the axis of the image at which each of a plurality of joints of a subject is located. The at least one processor is further configured to process the received training data in a convolutional neural network to generate a trained probabilistic model for predicting joint distribution and subject motion based on density estimation and to deploy the trained probabilistic model to a computer vision system, wherein the trained probabilistic model is configured to generate a probability distribution for each joint, the probability distribution indicating a likelihood that the joint will be located at each location along the axis. The apparatus may further include a memory coupled to the at least one processor. The memory may be configured to store at least one of the training data or the probability distribution for each joint.

Certain aspects of the present disclosure are directed to an apparatus for predicting subject motion. The apparatus generally includes means for receiving training data comprising a set of subject pose trees, wherein the set of subject pose trees comprises a plurality of subsets of subject pose trees, wherein each subset of subject pose trees is associated with an image in a sequence of images, and wherein each subject pose tree in the subset is associated with an axis of the image and indicates a location along the axis of the image at which each of a plurality of joints of a subject is located; means for processing the received training data in a convolutional neural network to generate a trained probabilistic model for predicting joint distribution and subject motion based on density estimation; and means for deploying the trained probabilistic model to a computer vision system, wherein the trained probabilistic model is configured to generate a probability distribution for each joint, the probability distribution indicating a likelihood that the joint will be located at each location along the axis.

Certain aspects of the present disclosure are directed to a non-transitory computer-readable medium. The non-transitory computer-readable medium generally includes instructions that, when executed by at least one processor, configure the at least one processor to perform an operation for predicting subject motion. The operation generally includes receiving training data comprising a set of subject pose trees, wherein the set of subject pose trees comprises a plurality of subsets of subject pose trees, wherein each subset of subject pose trees is associated with an image in a sequence of images, and wherein each subject pose tree in the subset is associated with an axis of the image and indicates a location along the axis of the image at which each of a plurality of joints of a subject is located; processing the received training data in a convolutional neural network to generate a trained probabilistic model for predicting joint distribution and subject motion based on density estimation; and deploying the trained probabilistic model to a computer vision system, wherein the trained probabilistic model is configured to generate a probability distribution for each joint, the probability distribution indicating a likelihood that the joint will be located at each location along the axis.

Other aspects, advantages, and features of the present disclosure will become apparent after review of the entire application, including the following sections: Brief Description of the Drawings, Detailed Description, and the Claims.

DETAILED DESCRIPTION

With reference now to the Figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Example Artificial Neural Networks

Figure 1:
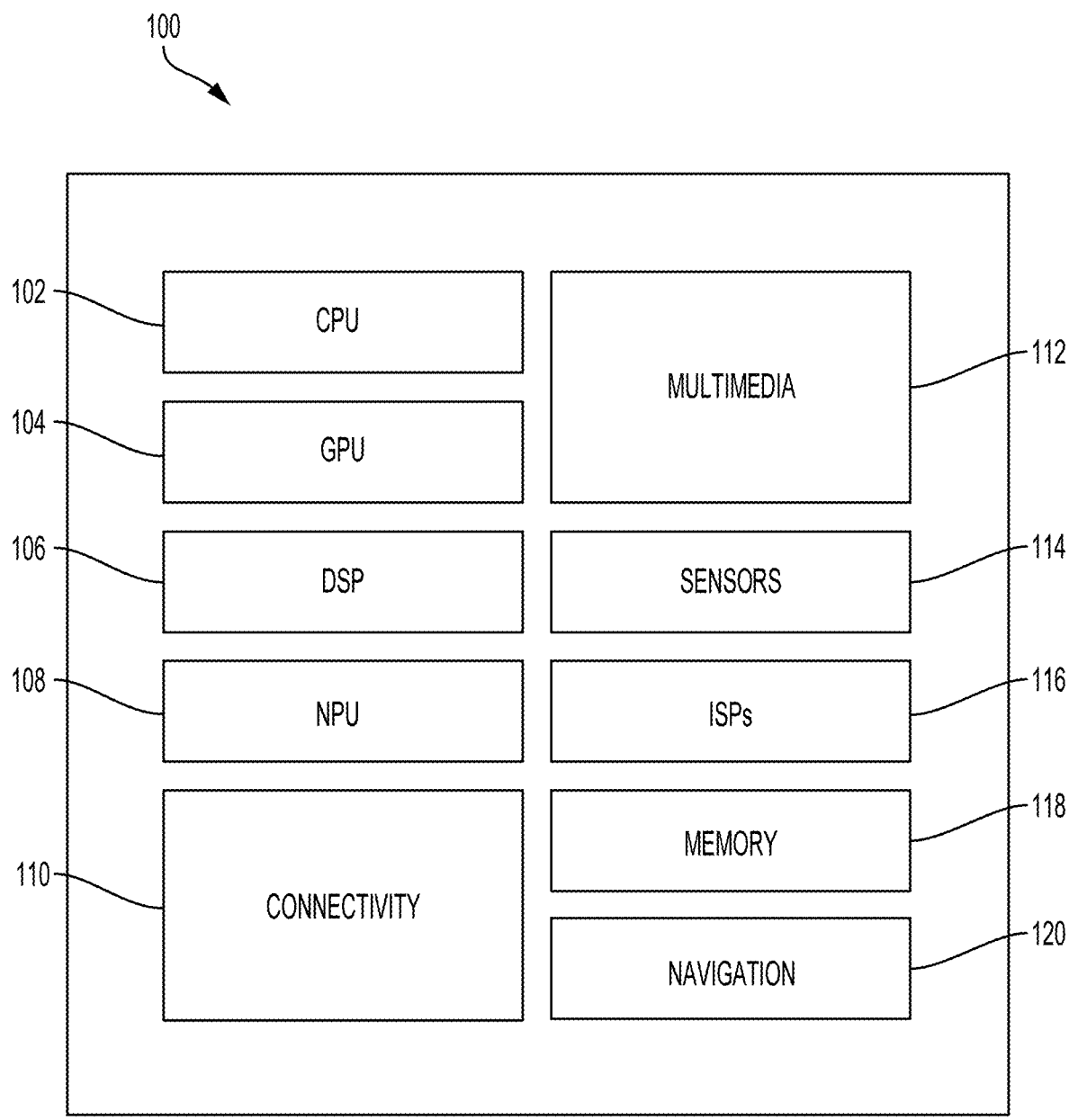
FIG. 1 illustrates an example implementation of a system-on-a-chip (SOC).

FIG. 1 illustrates an example implementation of a system-on-a-chip (SOC) 100, which may include a central processing unit (CPU) 102 or a multi-core CPU configured to perform a parallel Monte Carlo dropout function, in accordance with certain aspects of the present disclosure. Variables (e.g., neural signals and synaptic weights), system parameters associated with a computational device (e.g., neural network with weights), delays, frequency bin information, and task information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, or may be distributed across multiple blocks. Instructions executed at the CPU 102 may be loaded from a program memory associated with the CPU 102 or may be loaded from a memory block 118.

The SOC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures. In one implementation, the NPU is implemented in the CPU, DSP, and/or GPU. The SOC 100 may also include a sensor processor 114, image signal processors (ISPs) 116, and/or navigation module 120, which may include a global positioning system.

The SOC 100 may be based on an ARM instruction set. In an aspect of the present disclosure, the instructions loaded into the CPU 102 may comprise code to search for a stored multiplication result in a lookup table (LUT) corresponding to a multiplication product of an input feature value and a filter weight. The instructions loaded into the CPU 102 may also comprise code to disable a multiplier during a multiplication operation of the multiplication product when a lookup table hit of the multiplication product is detected. In addition, the instructions loaded into the CPU 102 may comprise code to store a computed multiplication product of the input feature and the filter weight when a lookup table miss of the multiplication product is detected.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 2A:
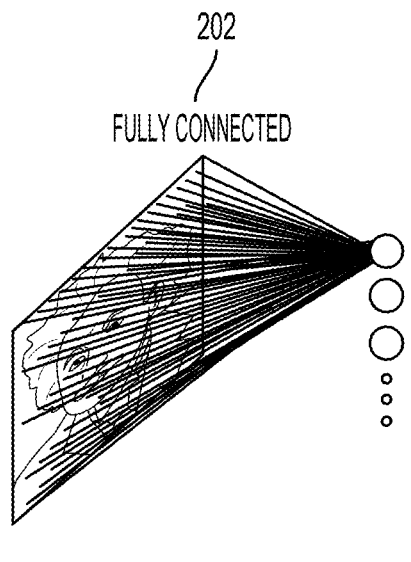
FIG. 2A illustrates an example of a fully connected neural network.
Figure 2B:
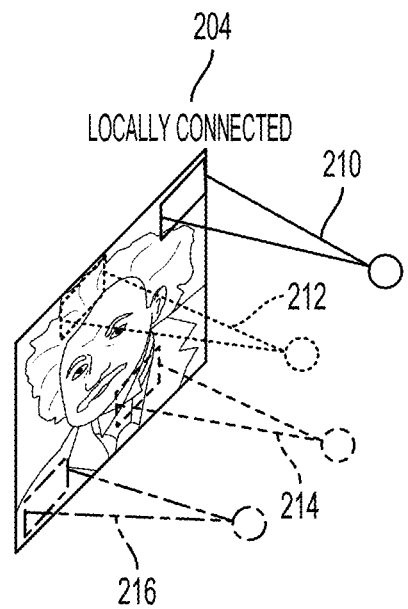
FIG. 2B illustrates an example of a locally connected neural network.

The connections between layers of a neural network may be fully connected or locally connected. FIG. 2A illustrates an example of a fully connected neural network 202. In a fully connected neural network 202, a neuron in a first layer may communicate its output to every neuron in a second layer, so that each neuron in the second layer will receive input from every neuron in the first layer. FIG. 2B illustrates an example of a locally connected neural network 204. In a locally connected neural network 204, a neuron in a first layer may be connected to a limited number of neurons in the second layer. More generally, a locally connected layer of the locally connected neural network 204 may be configured so that each neuron in a layer will have the same or a similar connectivity pattern, but with connections strengths that may have different values (e.g., 210, 212, 214, and 216). The locally connected connectivity pattern may give rise to spatially distinct receptive fields in a higher layer, because the higher layer neurons in a given region may receive inputs that are tuned through training to the properties of a restricted portion of the total input to the network.

Figure 2C:
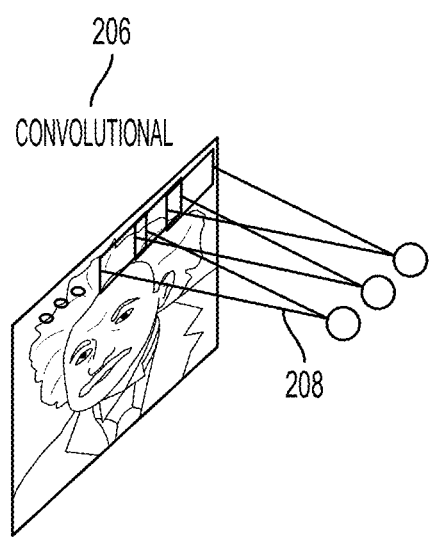
FIG. 2C illustrates an example of a convolutional neural network.

One example of a locally connected neural network is a convolutional neural network. FIG. 2C illustrates an example of a convolutional neural network 206. The convolutional neural network 206 may be configured such that the connection strengths associated with the inputs for each neuron in the second layer are shared (e.g., 208). Convolutional neural networks may be well suited to problems in which the spatial location of inputs is meaningful.

Figure 2D:
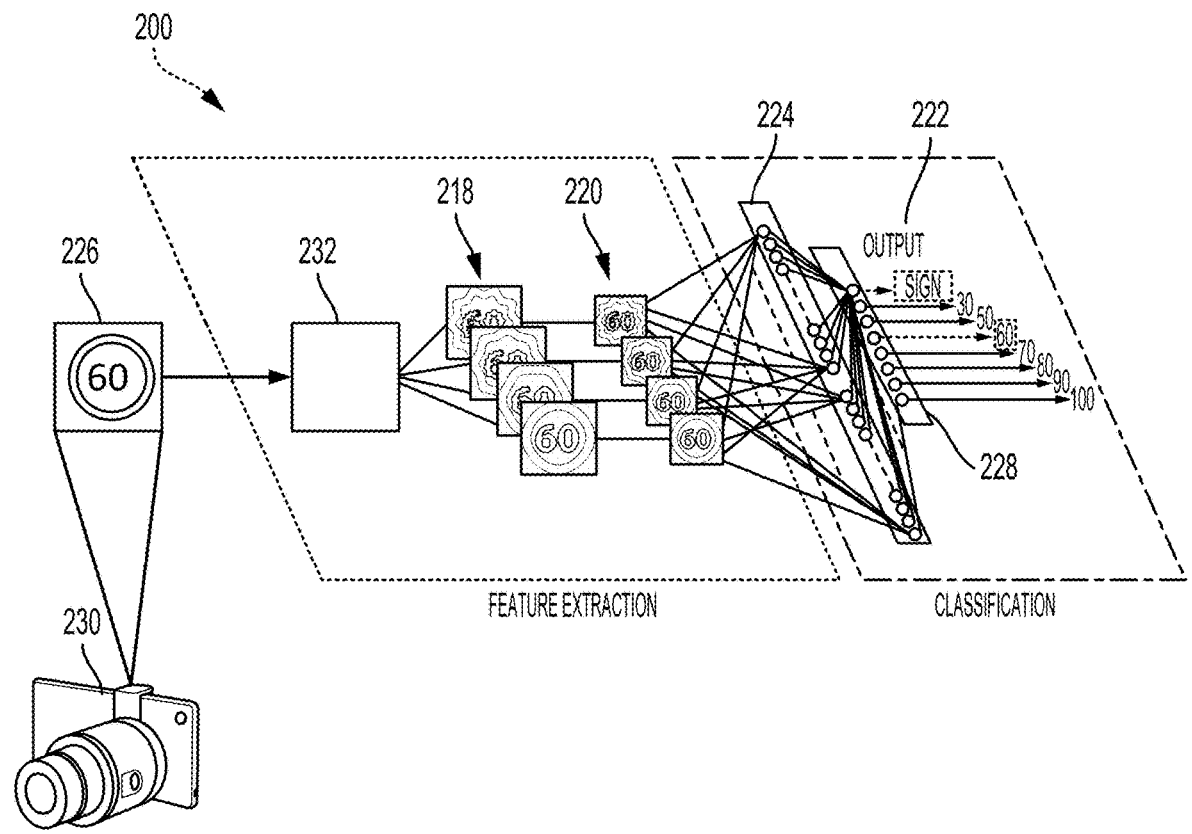
FIG. 2D illustrates a detailed example of a deep convolutional network (DCN) designed to recognize visual features from an image.

One type of convolutional neural network is a deep convolutional network (DCN). FIG. 2D illustrates a detailed example of a DCN 200 designed to recognize visual features from an image 226 input from an image capturing device 230, such as a car-mounted camera. The DCN 200 of the current example may be trained to identify traffic signs and a number provided on the traffic sign. Of course, the DCN 200 may be trained for other tasks, such as identifying lane markings or identifying traffic lights.

The DCN 200 may be trained with supervised learning. During training, the DCN 200 may be presented with an image, such as the image 226 of a speed limit sign, and a forward pass may then be computed to produce an output 222. The DCN 200 may include a feature extraction section and a classification section. Upon receiving the image 226, a convolutional layer 232 may apply convolutional kernels (not shown) to the image 226 to generate a first set of feature maps 218. As an example, the convolutional kernel for the convolutional layer 232 may be a 5×5 kernel that generates 28×28 feature maps. In the present example, because four different feature maps are generated in the first set of feature maps 218, four different convolutional kernels were applied to the image 226 at the convolutional layer 232. The convolutional kernels may also be referred to as filters or convolutional filters.

The first set of feature maps 218 may be subsampled by a max pooling layer (not shown) to generate a second set of feature maps 220. The max pooling layer reduces the size of the first set of feature maps 218. That is, a size of the second set of feature maps 220, such as 14×14, is less than the size of the first set of feature maps 218, such as 28×28. The reduced size provides similar information to a subsequent layer while reducing memory consumption. The second set of feature maps 220 may be further convolved via one or more subsequent convolutional layers (not shown) to generate one or more subsequent sets of feature maps (not shown).

In the example of FIG. 2D, the second set of feature maps 220 is convolved to generate a first feature vector 224. Furthermore, the first feature vector 224 is further convolved to generate a second feature vector 228. Each feature of the second feature vector 228 may include a number that corresponds to a possible feature of the image 226, such as "sign," "60," and "100." A softmax function (not shown) may convert the numbers in the second feature vector 228 to a probability. As such, an output 222 of the DCN 200 is a probability of the image 226 including one or more features.

In the present example, the probabilities in the output 222 for "sign" and "60" are higher than the probabilities of the others of the output 222, such as "30," "40," "50," "70," "80," "90," and "100". Before training, the output 222 produced by the DCN 200 is likely to be incorrect. Thus, an error may be calculated between the output 222 and a target output. The target output is the ground truth of the image 226 (e.g., "sign" and "60"). The weights of the DCN 200 may then be adjusted so the output 222 of the DCN 200 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level.

After learning, the DCN may be presented with new images (e.g., the speed limit sign of the image 226) and a forward pass through the network may yield an output 222 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, max(0,x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 3:
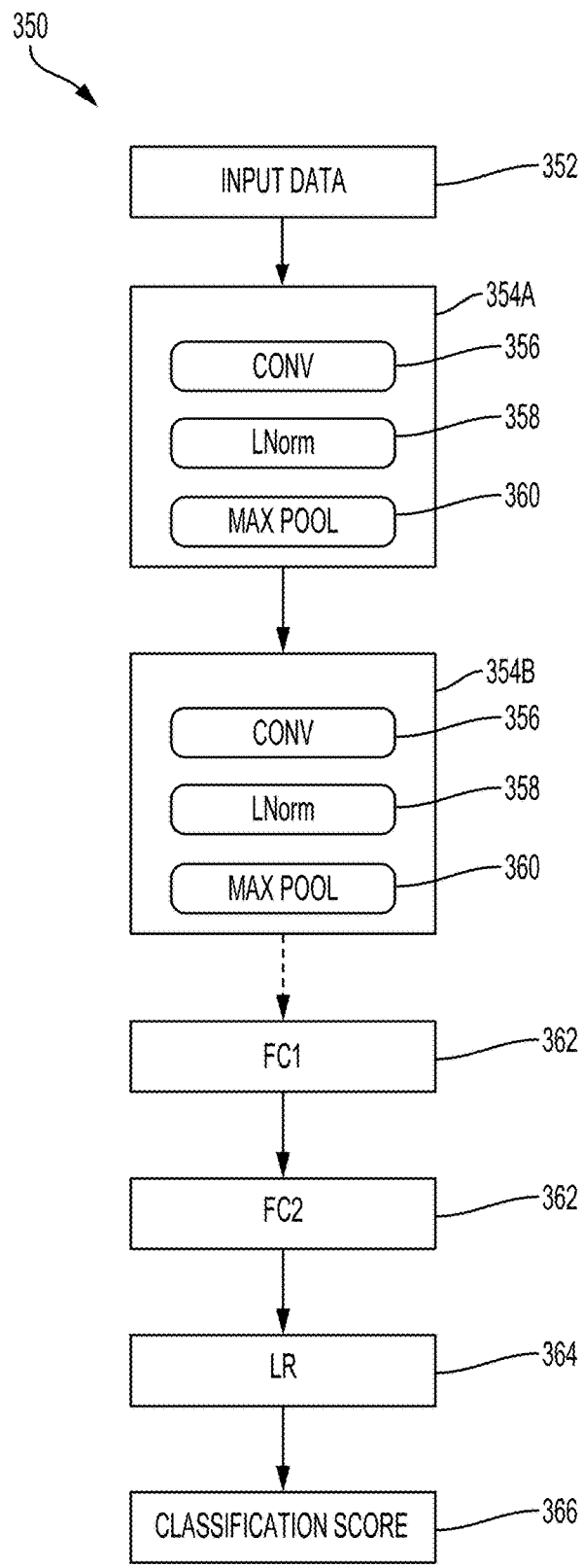
FIG. 3 is a block diagram illustrating a deep convolutional network (DCN).

FIG. 3 is a block diagram illustrating a deep convolutional network 350. The deep convolutional network 350 may include multiple different types of layers based on connectivity and weight sharing. As shown in FIG. 3E, the deep convolutional network 350 includes the convolution blocks 354A, 354B. Each of the convolution blocks 354A, 354B may be configured with a convolution layer (CONV) 356, a normalization layer (LNorm) 358, and a max pooling layer (MAX POOL) 360.

The convolution layers 356 may include one or more convolutional filters, which may be applied to the input data to generate a feature map. Although only two of the convolution blocks 354A, 354B are shown, the present disclosure is not so limiting, and instead, any number of the convolution blocks 354A, 354B may be included in the deep convolutional network 350 according to design preference. The normalization layer 358 may normalize the output of the convolution filters. For example, the normalization layer 358 may provide whitening or lateral inhibition. The max pooling layer 360 may provide down sampling aggregation over space for local invariance and dimensionality reduction.

The parallel filter banks, for example, of a deep convolutional network may be loaded on a CPU 102 or GPU 104 of an SOC 100 to achieve high performance and low power consumption. In alternative aspects, the parallel filter banks may be loaded on the DSP 106 or an ISP 116 of an SOC 100. In addition, the deep convolutional network 350 may access other processing blocks that may be present on the SOC 100, such as sensor processor 114 and navigation module 120, dedicated, respectively, to sensors and navigation.

The deep convolutional network 350 may also include one or more fully connected layers 362 (FC1 and FC2). The deep convolutional network 350 may further include a logistic regression (LR) layer 364. Between each layer 356, 358, 360, 362, 364 of the deep convolutional network 350 are weights (not shown) that are to be updated. The output of each of the layers (e.g., 356, 358, 360, 362, 364) may serve as an input of a succeeding one of the layers (e.g., 356, 358, 360, 362, 364) in the deep convolutional network 350 to learn hierarchical feature representations from input data 352 (e.g., images, audio, video, sensor data and/or other input data) supplied at the first of the convolution blocks 354A. The output of the deep convolutional network 350 is a classification score 366 for the input data 352. The classification score 366 may be a set of probabilities, where each probability is the probability of the input data including a feature from a set of features.

Example Probabilistic Generative Model for
Forecasting Subject Body Pose and Motion Intent As used herein, a "subject" generally refers to a human, another type of animal, a machine implemented with joints for motion (e.g., a cyborg or other robots), or a representation thereof (e.g., an image of a human). Predicting subject motion may be used in a variety of environments. For example, in autonomous driving applications, predictions of subject motion may be used to anticipate pedestrian movement intent (e.g., whether a pedestrian in the field of vision of one or more cameras on an autonomous vehicle is going to move and cause a collision with the autonomous vehicle). In augmented reality applications, predictions of subject motion may be used to display, to a user of an augmented reality application, the predicted location and movement of another subject over time. In still and/or video capture scenarios, predicted subject motion may be used to adjust a focus point such that a subject remains in focus while still or video footage is captured. In still other examples, predicted human motion may be used in human-robot interaction to cause actuators or other movement mechanisms on a robot to prepare for motion in a particular direction.

Conventionally, subject motion may be predicted using discriminative mappings over time. Regressive models may be used to predict subject motion, and these regressive models may predict an absolute coordinate in an image frame at which a joint may be located at a future point in time. However, regressive models may not account for the uncertainty of future movements, various plausible future poses that may result from an observed pose, the complexity of subject body motion, occlusion of joints in captured images, false detections of joints, and the like. Further, recurrent models may accumulate an amount of error over time. Because discriminative models can use predicted joint locations at one point in time to predict joint locations at a future point in time, noisy and potentially inaccurate predictions may be used to predict future joint locations. The accumulation of noise and inaccurate predictions over the long term may result in poor predictions of future subject motion and joint distribution.

To improve the accuracy of predicted subject body poses and motion intent, aspects of the present disclosure provide for the generation of subject pose trees and training of a convolutional neural network (e.g., an autoregressive deep neural network) using subject pose trees to generate a probabilistic model. The probabilistic model generates a probability distribution identifying a likelihood that a joint is located at a particular location on an axis in space at a given time, and the probability distributions may be used to generate heatmaps and colorized images representing joint motion. These colorized images may be used to predict a subject pose (e.g., based on the relative positions of each joint of the subject in an image) and a movement intent from the predicted pose, and a variety of applications can take one or more actions based on the predicted movement intent. By generating and applying probabilistic models for predicting subject motion using subject pose trees, aspects of the present disclosure may account for the uncertainty of plausible future poses in predicting subject motion and may infer such motion in real-time.

Figure 4:
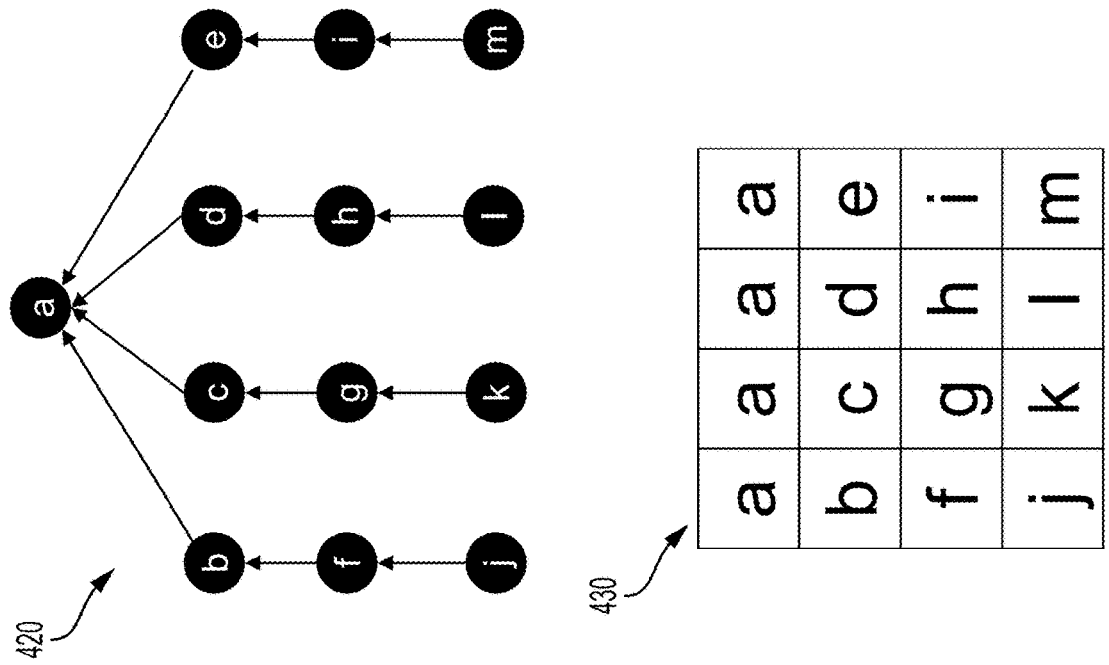
FIG. 4 illustrates an example subject pose, a subject pose tree generated from the subject pose, and a two-dimensional tensor representing the subject pose tree, according to aspects presented herein.
Figure 4:
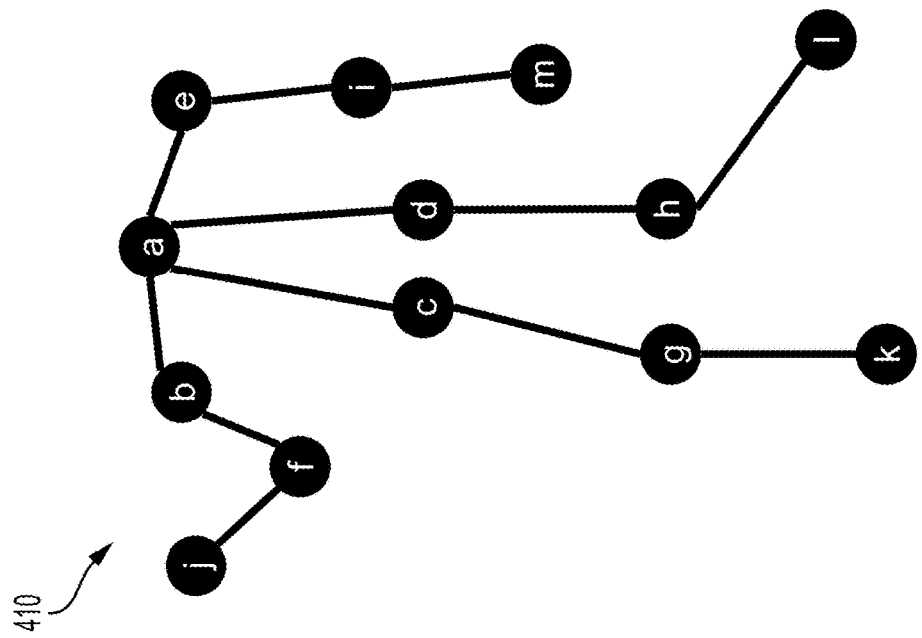

FIG. 4 illustrates an example subject pose, a subject pose tree, and two-dimensional tensors generated to represent the subject pose, according to aspects described herein. As illustrated, a subject pose 410 may be represented as a series of joints connected to each other. Subject pose 410 may have a root joint that the other joints in the subject pose are directly or indirectly connected to. For example, Joint A may be the root joint for the subject and may represent the neck. Joints B, C, D, and E are connected directly to Joint A. Joints B and E may represent the right and left shoulders, for example, whereas Joints C and D may represent the right and left hips, respectively. Joints F, G, H, and I are connected with Joint A through Joints B, C, D, and E, respectively. Joints F and I may represent the right and left elbows, for example, whereas Joints G and H may represent the right and left knees, respectively. Finally, each of Joints J, K, L, and M in subject pose 410 is connected with Joint A through two other joints, as shown. Joints J and M may represent the right and left wrists, for example, whereas Joints K and L may represent the right and left ankles, respectively. Because of the structure of the joint relationships in subject pose 410, it may be determined a priori that the movement of Joints B, C, D, and E may depend on the movement of Joint A; the movement of Joints F, G, H, and I may depend on the movement of Joints B, C, D, and E, respectively; and the movement of Joints J, K, L, and M may depend on the movement of Joints F, G, H, and I, respectively.

Based on these determinations, a subject pose tree 420 may be generated to represent the dependencies of the joints in subject pose 410. The subject pose tree 420 may be structured such that the level of the subject pose tree 420 at which a joint is located may indicate that joint's immediate parent joint. For example, as illustrated, Joint A represents the root node in subject pose tree 420, as Joint A is not connected to any parent joint and serves as the ultimate parent joint to the other joints in subject pose 410. Joints B, C, D, and E are connected directly to Joint A in subject pose tree 420, representing joints that are directly connected to Joint A in subject pose 410. The next level of subject pose tree 420 represents joints that are connected with Joint A (the root node in subject pose tree 420) through an intermediary joint (e.g., Joints F, G, H, and I). Finally, the bottom level of subject pose tree 420 represents joints that are connected with Joint A (the root node in subject pose tree 420) through two intermediary joints.

While subject pose tree 420 may be useful in representing the dependencies of joints captured in subject pose 410, the structure of subject pose tree 420 may not be conducive for use in training probabilistic models for predicting subject motion. Thus, subject pose tree 420 may be transformed into a two-dimensional tensor 430 representing the data and dependencies illustrated in subject pose tree 420. The two-dimensional tensor 430 may also be referred to as a two-dimensional matrix. As illustrated, two-dimensional tensor 430 includes a plurality of rows and a plurality of columns. Each row may represent a different level in subject pose tree 420. For example, row 1 in two-dimensional tensor 430 may represent the root node (e.g., Joint A) in subject pose tree 420, row 2 in two-dimensional tensor 430 may represent the nodes at the second level of subject pose tree 420 (e.g., Joints B, C, D, and E), row 3 in two-dimensional tensor 430 may represent the nodes at the third level of subject pose tree 420 (e.g., Joints F, G, H, and I), and so on. More generally, the $n^{th}$ row in two-dimensional tensor 430 may represent the nodes in level ii of subject pose tree 420.

Each column in two-dimensional tensor 430 generally identifies a sequence of joint dependencies from a first joint to an $N^{th}$ joint. Because each row represents nodes at an $n^{th}$ level of subject pose tree 420, each column may identify a series of joints in order from a root node to the joint furthest away from the root node. This series of joints may preserve joint dependencies identified in the subject pose tree. To generate a set of data for use in training a probabilistic model for predicting subject motion, the locations (e.g., in terms of an image pixel coordinate along an axis of the image) of each joint may be inserted at the appropriate location in the two-dimensional tensor 430, one tensor per axis of the image space. For example, in a scenario where subject pose 410 represents a human pose, each entry in the first row of two-dimensional tensor 430 may represent a location of the subject's neck. Assuming the subject is posed facing away from the viewpoint (e.g., the camera), the remaining entries in a first column of two-dimensional tensor 430 may represent locations of the subject's left shoulder, left elbow, and left wrist; the entries in a second column of two-dimensional tensor 430 may represent locations of the subject's left hip, left knee, and left ankle; the entries in a third column of two-dimensional tensor 430 may represent locations of the subject's right hip, right knee, and right ankle; and the entries in a fourth column of two-dimensional tensor 430 may represent locations of the subject's right shoulder, right elbow, and right wrist.

Figure 5:
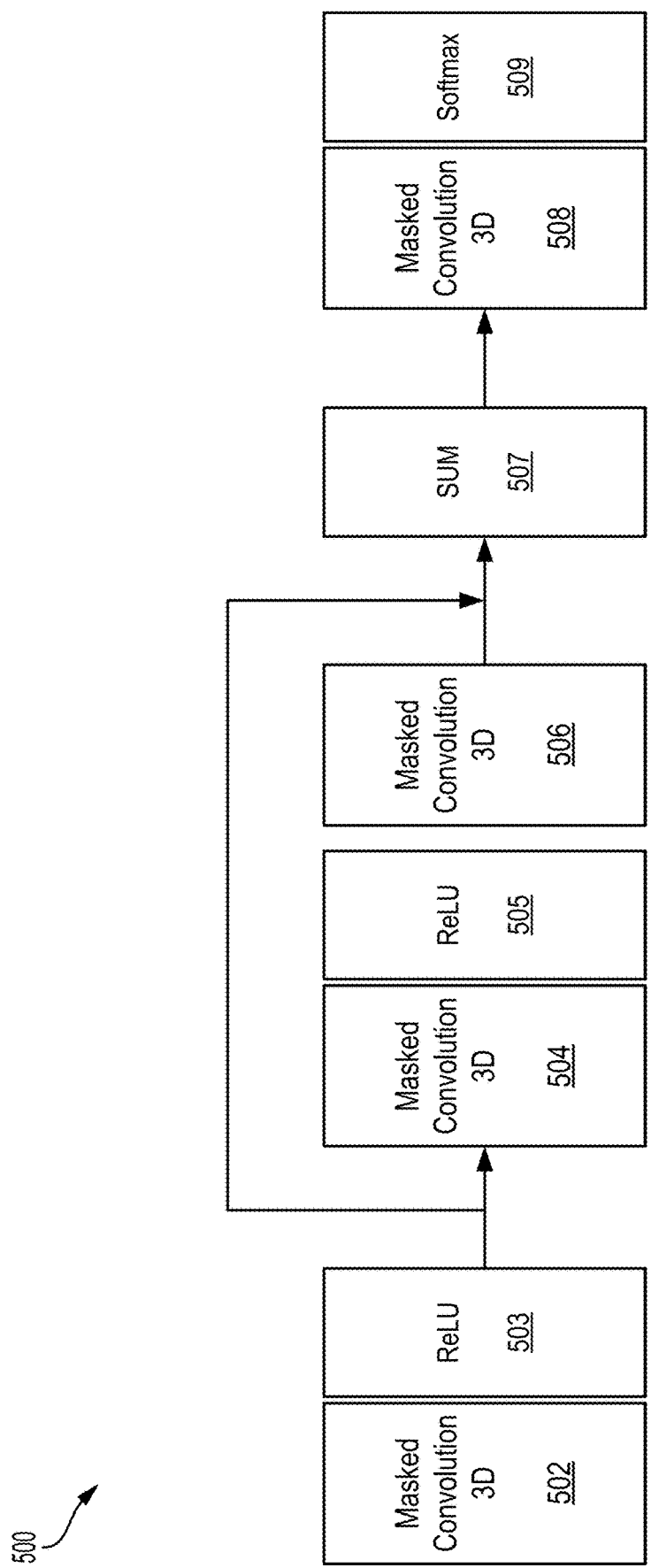
FIG. 5 illustrates an example stack of convolutional layers that may be used to generate an auto-regressive probabilistic model for predicting joint distribution and subject motion, according to aspects presented herein.

FIG. 5 illustrates an example joint generative model architecture 500 used in generating a probabilistic model for predicting subject motion based on the structure of subject pose tree 420, represented by two-dimensional tensor 430. Joint generative model 500 may be based on auto-regressive models and may be configured as a generative model that takes the uncertainty of plausible future poses into account in generating probability distributions estimating future subject motion and joint location.

As illustrated, joint generative model 500 may be based on a stack of three-dimensional (3D) convolutional layers. A rectified output of a first masked 3D convolutional layer 502 processed through a first rectified linear unit (ReLU) 503, may be input into a summation function 507 and may additionally be input into a second masked 3D convolutional layer 504. The output of the second masked 3D convolutional layer 504 may be processed through a second ReLU 505, and the output of the second ReLU 505 may be processed through a third masked 3D convolutional layer 506. The output of the third masked 3D convolutional layer 506 may be provided to summation function 507, and the summation of the rectified output of the first 3D convolutional layer 502 and the output of the third masked 3D convolutional layer 506 may be provided as input to a fourth masked 3D convolutional layer 508. The output of the fourth masked 3D convolutional layer 508 may be processed through a softmax function 509, discussed above, to result in a trained probabilistic model that generates probability distributions for the position of a joint along an axis in space. As discussed, the inputs into the first masked 3D convolutional layer 502 may include a two-dimensional tensor 430 for each axis along which a prediction of joint position and motion may be requested.

The convolutional layers 502, 504, 506, and 508 may use a kernel size of 5×3×3, for example, such that the convolutional layers examine a depth of five frames over a 3×3 space. More or less than five frames may be used. The 3×3 space may be configured to represent directional movement of a joint over a two-dimensional plane (e.g., the joint can move in eight different directions: up, down, left, right, and diagonals between these four different directions). If a joint location remains the same (e.g., in the center of the 3×3 space) across different frames, a convolutional layer 502 can infer that the joint has not moved. Otherwise, if a joint location changes across different frames, the new location of the joint in the 3×3 space may indicate a direction of movement.

As discussed, some convolution layers may be followed by rectified linear unit (ReLU) non-linearity. In some aspects, the last convolutional layer of each residual block may not be followed by ReLU non-linearity. The joint generative model 500 may generate 24 feature maps for each convolutional layer other than the last convolutional layer, and the last layer of the joint generative model 500 may produce a number N of feature maps corresponding to the height and width of the frame.

Figure 6:
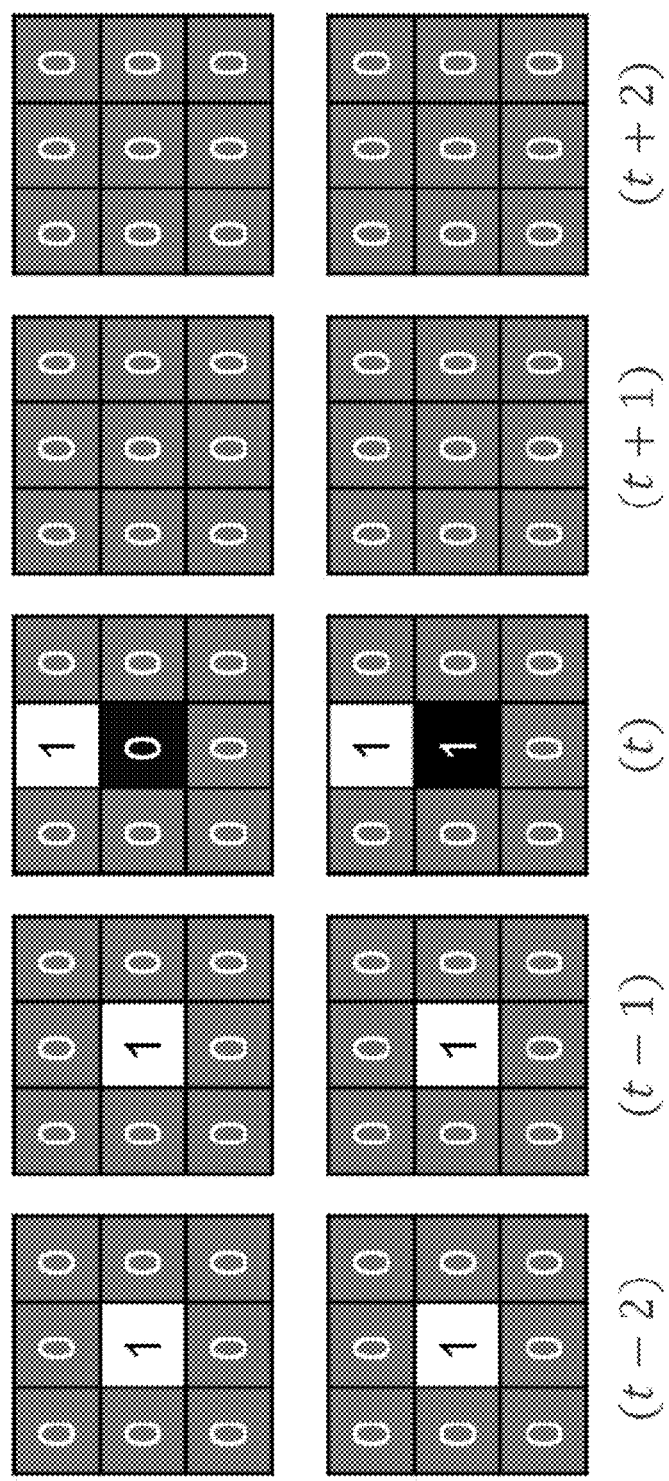
FIG. 6 illustrates example masks of data associated with joint motion used to train a probabilistic model for predicting joint distribution and subject motion, according to aspects presented herein.

In some aspects, the feature maps may be partially masked-out with three-dimensional masks 600, illustrated in FIG. 6. The masks 600 are referred to as three-dimensional, since the masks are two-dimensional in space (e.g., 3×3), but cover a sequence of frames in time (e.g., 5 frames), where time is the third dimension here. The first convolutional layer (e.g., convolutional layer 502) may be masked with a first mask, designated Mask F for "first," and the other convolutional layers (e.g., layers 504, 506, and 508) may be masked with a second mask, designated Mask O for "other." By masking the convolutional layers, joint generative model 500 may learn the dependencies between joints in subject pose tree 420 over time. Further, masking the convolutional layers using three-dimensional masks 600 may restrict connections in the joint generative model 500 to specific dependencies between joints in subject pose tree 420 (e.g., so that the joint generative model 500 does not infer dependencies between unrelated joints). The masks, as illustrated, may be applied spatially and temporally (e.g., across different frames).

As illustrated, Mask F in the set of three-dimensional masks 600 may be masked such that the first convolutional layer in joint generative model 500 is unable to examine input data points at the current time t. The other convolutional layers in joint generative model 500 may examine a feature space and thus may be allowed to look at input data points and feature maps. In some aspects, while training joint generative model 500, the convolutional layers in joint generative model 500 may be configured to look at the joint masks at time points (t−2), (t−1), and t to learn how a joint moves over time. Further, at time points (t−2) and (t−1), joint generative model 500 may examine the location of a joint, and to learn spatial and temporal dependencies between related joints (e.g., the joint and a parent joint), the joint generative model 500 may examine the location of the joint and the parent joint at time r. While training joint generative model 500, the convolutional layers of joint generative model 500 need not examine masks associated with time points (t+1) and (t+2) (e.g., infer positions of joints in the future); however, at inference time, joint generative model 500 may be configured to examine the masks from time point (t−2) to time point (t+2) to predict joint movement and location one-by-one from a parent joint to its child joints.

During inference processes to predict the joint location and motion, partially available subject pose trees may be provided to joint generative model 500 as input. Joint generative model 500 may be configured to probabilistically generate future subject pose trees based on the partially available subject pose trees. Subject pose trees may be generated for a specific time point sequentially, row-by-row (e.g., generating pose trees by predicting probable locations of the root joint in the subject pose tree 420, then immediate child joints of the root joint, then successively lower levels of joints until the probable locations of each joint in subject pose tree 420 are determined).

Figure 7:
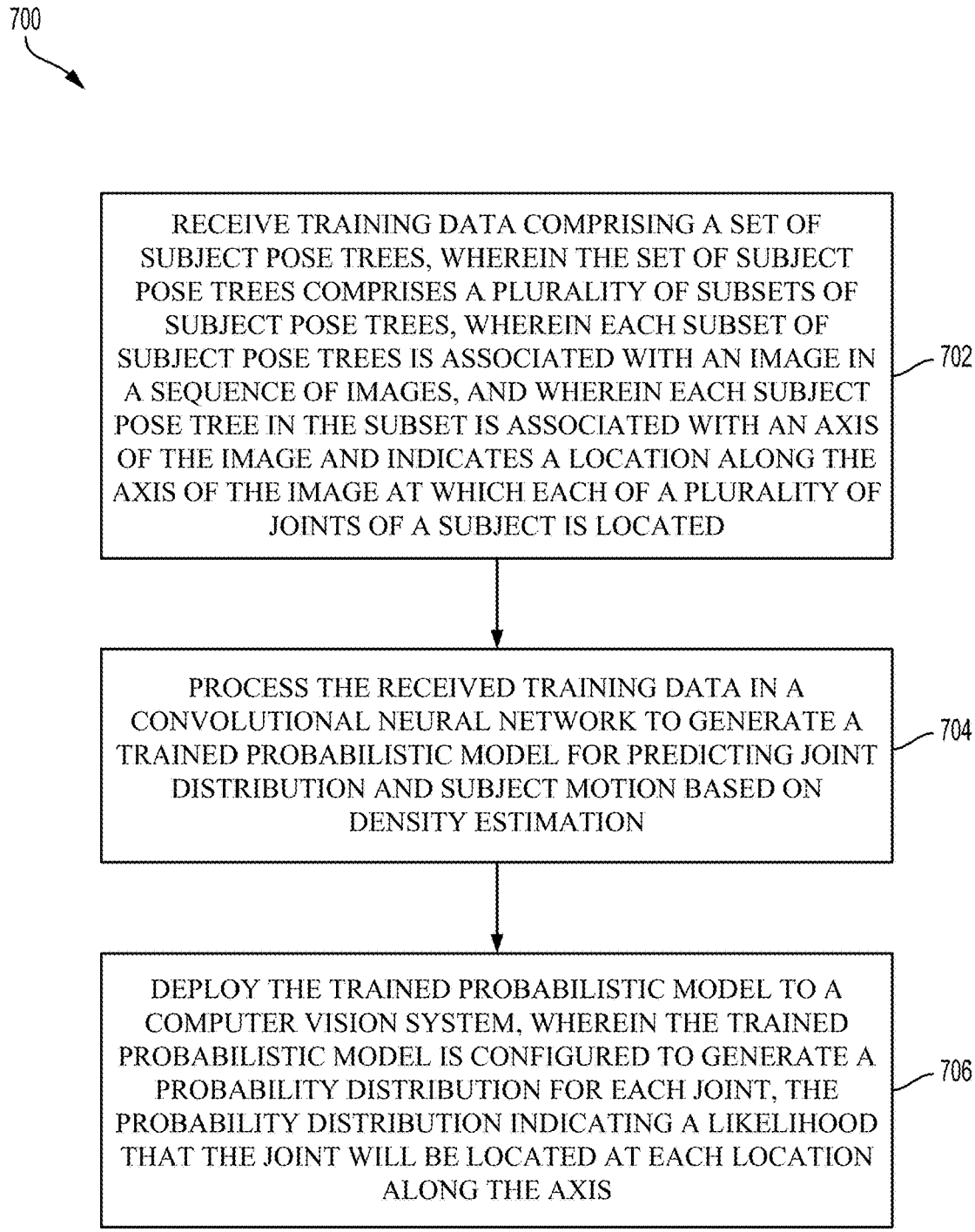
FIG. 7 illustrates example operations for generating a probabilistic model for predicting joint distribution and subject motion based on subject pose trees, according to aspects presented herein.

FIG. 7 illustrates example operations for generating a probabilistic model for predicting subject motion, according to aspects described herein. As illustrated, operations 700 begin at block 702, where a system receives training data comprising a set of subject pose trees. The set of subject pose trees may comprise a plurality of subsets of subject pose trees. Each subset of subject pose trees may be associated with an image in a sequence of images depicting the subject. Each subject pose tree in the subset may be associated with an axis of the image and may indicate a location along the axis of the image at which each of a plurality of joints of the subject is located.

At block 704, the system processes the received training data in a convolutional neural network to generate a trained probabilistic model for predicting joint distribution and subject motion based on density estimation. Density estimation in probability and statistics is the generation of an estimate, based on observed data, of an unobservable underlying probability density function. Here, density estimation techniques may allow for the prediction of joint distribution and subject motion by generating probability distributions representing a likelihood of a joint being located at each position along an axis of an image at a given point in time. As discussed in further detail below, the trained probabilistic model may generate a probability distribution for the position of a joint from an input of previously captured motion activity. The probability distribution may be generated as an estimate of a percentage of projections including the joint at a particular location on an axis in space.

At block 706, the system deploys the trained probabilistic model to a computer vision system. The trained probabilistic model may be configured to generate a probability distribution for each joint. The probability distribution generated by the trained probabilistic model may indicate a likelihood that the joint will be located at each location along the axis of the image.

In some aspects, the convolutional neural network may comprise an autoregressive deep neural network.

In some aspects, the system may process the received training data by generating, from each subject pose tree, a two-dimensional matrix having a plurality of columns, wherein each column of the matrix represents a sequence of joint dependencies from a first joint to an $n^{th}$ joint and preserves joint dependencies identified in the subject pose tree. The trained probabilistic model may be generated based on the generated two-dimensional matrices.

In some aspects, each element in the two-dimensional matrix may represent the location along an axis of a joint in the plurality of joints of the subject. Each element in the matrix may represent a location along an axis of a joint in the plurality of joints of the subject. In some aspects, a joint dependency in the sequence of joint dependencies may define a parent joint and an immediately adjacent joint dependent on the parent joint.

In some aspects, the convolutional neural network is configured to examine a position of a joint at a plurality of time points prior to a given point in time and examine the position of the joint and a position of its parent joint at the given point in time to learn spatial and temporal dependencies of the joint and the parent joint.

In some aspects, the convolutional neural network comprises a stack of three-dimensional convolutional layers. The stack of three-dimensional convolutional layers may comprise a first convolutional layer masked against input data points and one or more other convolutional layers following the first convolutional layer that are unmasked against the input data points. In some aspects, the first convolutional layer and the other convolutional layers are configured to use a kernel representing possible directions in which a joint in the subject pose tree can move.

The probabilistic model—trained using subject pose trees input into a convolutional neural network as described herein—may provide improved accuracy relative to regressive models that predict joint location in a recurrent neural network. For example, the probabilistic models described herein may predict joint positions with improved accuracy relative to conventional models the further out predictions are made. The mean joint displacement of the predicted joint location versus the actual joint location, for example, after predicting joint location about one second into the future may be less than half the mean joint displacement of a prediction generated using a recurrent model. Further, the predictions generated by the probabilistic model described herein may be generated in near-real-time (e.g., for an input of frames at 30 frames per second, within the duration of a frame), and the time involved to predict subject motion and joint location may be independent of the size of the input frame.

The probabilistic models described herein may be used to forecast, or predict, the intent of subject motion based on an observed set of subject motion. For example, for an image sequence of length T, it may be desirable to determine the subject's motion intent in a time t that is less than T, in some scenarios significantly less than T (t<<T). Such predictions may be made in autonomous vehicle applications, where a determination of subject motion intent may need to be made in time to take action (e.g., applying the brakes of the autonomous vehicle, taking evasive action to drive around the subject, etc.) to avoid a collision with the subject. In another example, the predictions may be made in image capture operations, where a determination of subject motion intent may need to be made in an amount of time that minimizes an amount of time in which the subject is out of focus.

Generally, the position of a subject's joints in three-dimensional space may be represented as a sequence of coordinates along the X, Y, and Z axes (for use in a recurrent neural network for classification) or as trajectory images in which heatmaps are generated around a pair of coordinates and joint motion is colorized according to relative time (for use in a convolutional neural network for classification). As discussed above, because regressive models may not be able to accurately predict joint location and future subject motion in the future due to cascading uncertainty, aspects of the present disclosure provide for the generation of heatmaps based on probability distributions of predicted joint location along an axis in (image) space to predict subject motion.

Figure 8:
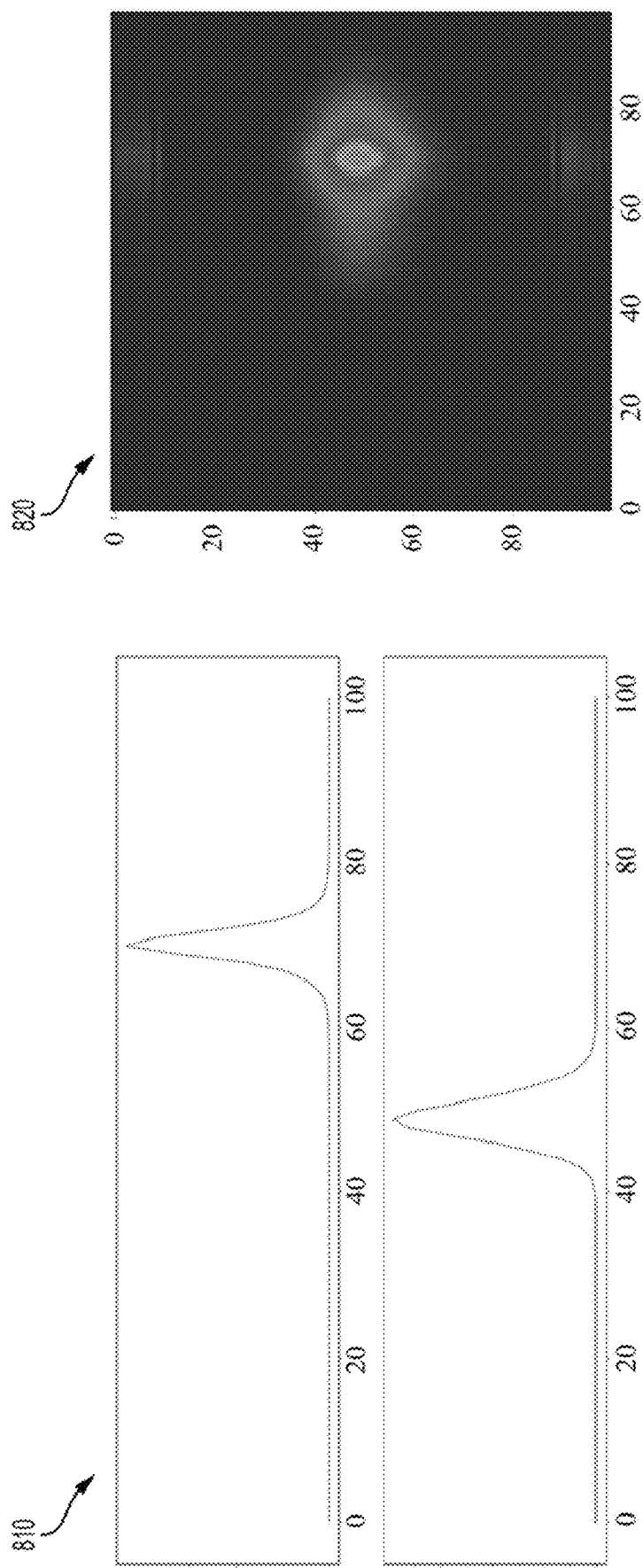
FIG. 8 illustrates example probability distributions and a heatmap representing a predicted location of a joint, according to aspects presented herein.

FIG. 8 illustrates probability distributions for the predicted location of a joint and a heatmap generated from the probability distributions, according to aspects of the present disclosure. To predict future subject motion and determine a motion intent associated with the future subject motion, probability distributions 810 may be generated for each joint using a probabilistic model (e.g., joint generative model 500 described above). As illustrated, the probability distributions 810 may include a first probability distribution illustrating a likelihood that a joint is located at a particular location along a first axis (e.g., the X axis) and a second probability distribution illustrating a likelihood that a joint is located at a particular location along a second axis (e.g., the Y axis). The first and second axes may be orthogonal. In some aspects, the probability distribution may represent a relative location in an image frame at which a joint may be located (e.g., at 0-100 percent of the length of an axis) rather than an absolute pixel location in the image frame to allow for any size of image (which may be downscaled by a computer vision system prior to being input into the probabilistic model) to be provided as input. As illustrated, probability distributions 810 indicate that the joint for which probability distributions 810 were generated is likely to be located at a position corresponding to between 60 and 80 of the length of the first axis and between 40 and 60 percent of the length of the second axis, with the highest probability location being at about 70 percent of the length of the first axis and about 50 percent of the length of the second axis. Based on probability distribution 810, heatmap 820 may be generated. Heatmap 820 generally illustrates a likelihood that a joint is located at a particular position in a two-dimensional space (e.g., the X-Y plane) at a given time based on the color at any given location of the two-dimensional space. Darker colors (e.g., black or colors near RGB 0, 0, 0) may represent locations at which a joint is unlikely to be located, while brighter colors may represent differing probabilities of the joint being located in a particular location. In some aspects, the heatmap may be generated in grayscale, with lighter shades of grey representing higher probabilities for the location of a joint in a two-dimensional space. In some aspects, the heatmap may be generated in color, with brighter colors representing higher probabilities for the location of a joint.

Based on the heatmaps generated by the probabilistic model described herein, the joint may be colorized for a specific point in time according to the equation:

$$o(t) = \left[\frac{t}{T}, 1, \frac{t}{T}\right]$$

Figure 9:
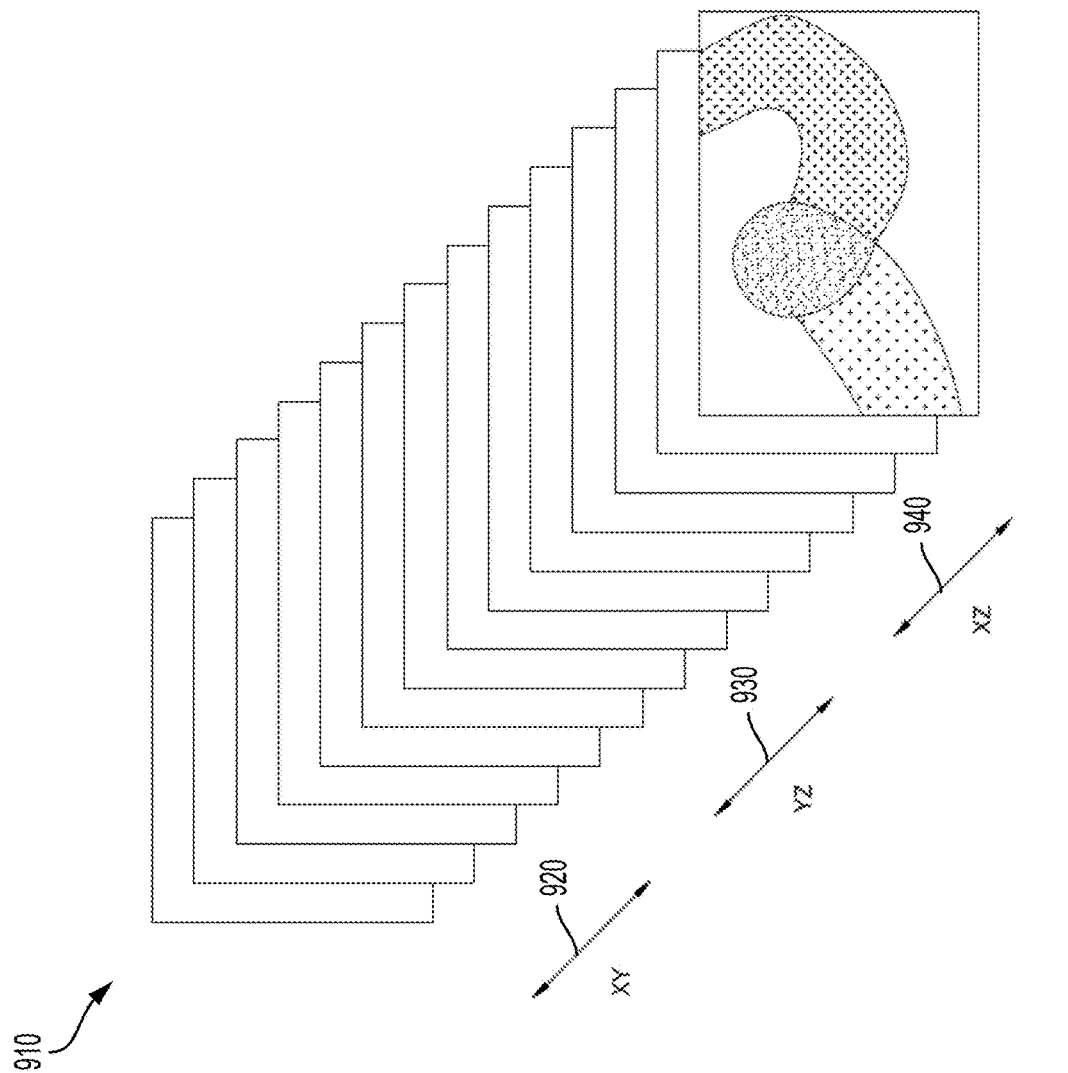
FIG. 9 illustrates an example stack of colorized joint motions that may be used in determining a motion intent from a predicted subject motion, according to aspects presented herein.

Given the colorized joint over time on different planes in three-dimensional space (e.g., the X-Y plane 920, the Y-Z plane 930, and the X-Z plane 940), a system can stack the colorized joints together to form a representation for the whole sequence of predicted joint positions and subject motion over a period of time in the future, Each dynamic image in the stack may represent motion of a particular joint in a particular plane, with different colors (illustrated in FIG. 9 as different patterns in a dynamic image) in the dynamic image representing an order of joint motion over time. As illustrated, the stack of colorized joints 910 in FIG. 9 colorizes the joint with three two-dimensional tensors. Based on the colorized stack of dynamic images, projected on different planes in 3D space, a convolutional neural network can be used to determine and classify a predicted pose at a future point in time and determine a motion intent based on the classification of the predicted pose.

Classification of a predicted subject pose and determination of a motion intent from the classification of the predicted subject pose described above with respect to colorization of a joint over time may provide a useful visualization to a viewer or observer of a subject. However, it should be recognized that techniques other than analyzing colorized images may be used to classify a predicted pose and determine a motion intent from the classification of the predicted pose. For example, numeric representations of probability may be used to predict a subject pose, classify the predicted pose, and determine a motion intent from the classification.

Figure 10:
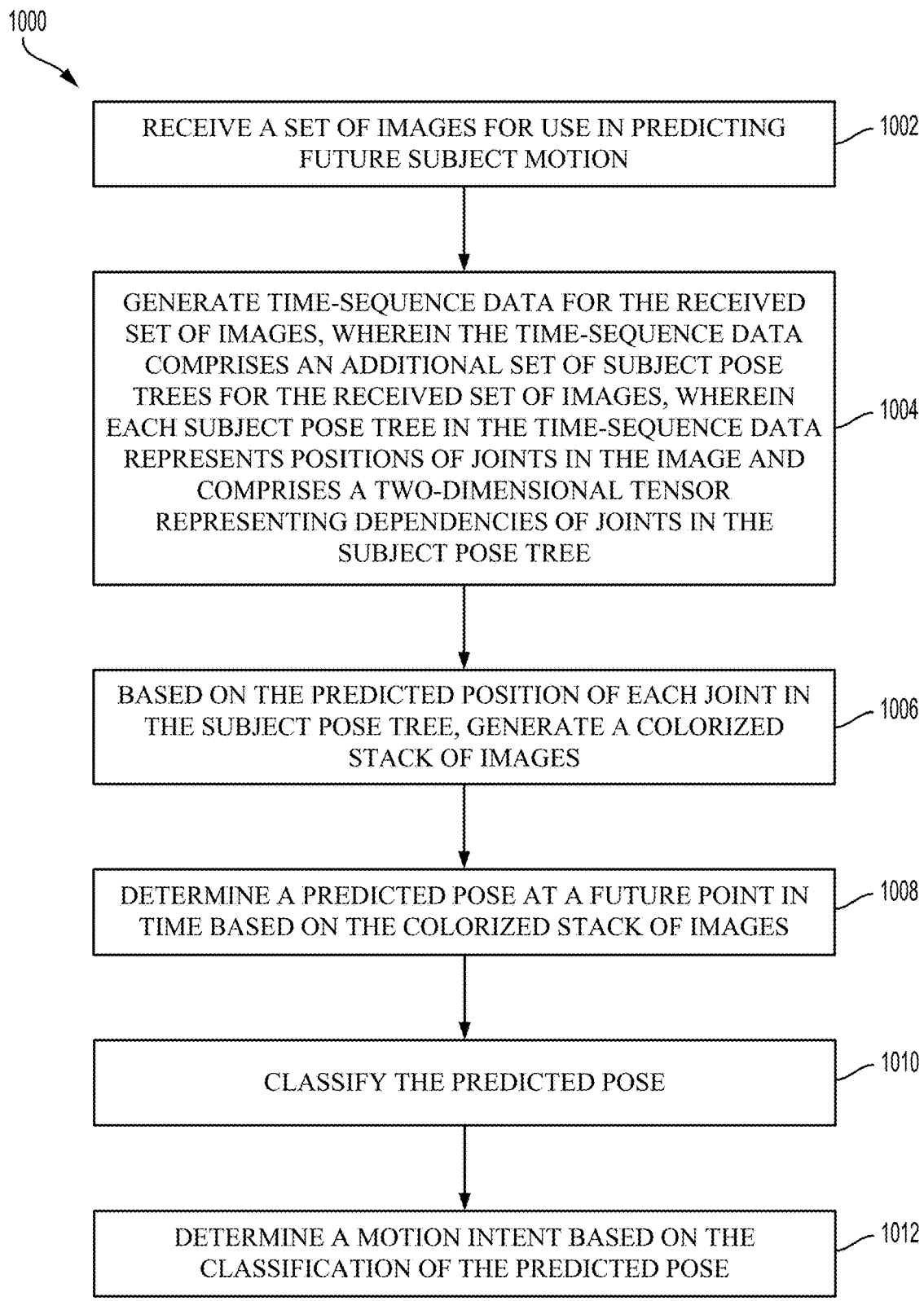
FIG. 10 illustrates example operations for predicting future subject motion using an auto-regressive probabilistic model, according to aspects presented herein.

FIG. 10 illustrates example operations for determining a motion intent using a probabilistic model for predicting joint location and subject motion, according to aspects described herein. As illustrated, operations 1000 may begin at block 1002, where a system receives a set of images for use in predicting future subject motion. In some aspects, the system may downscale the received set of images to accelerate determinations of motion intent or to ensure that each image in the received set of images is the same size.

At block 1004, the system generates time-sequence data for the received set of images. The time-sequence data generally comprises an additional set of subject pose trees for the received set of images. Each subject pose tree in the time-sequence data represents positions of joints in a specific image and comprises a two-dimensional tensor representing dependencies of joints in the subject pose tree, as discussed above.

At block 1006, the system predicts, for one or more future points in time, a position of each joint in the subject pose tree by applying a trained probabilistic model to the time-sequence data. The predicted position of each joint may be based on a probability distribution generated by the trained probabilistic model from an analysis of the generated time-sequence data.

At block 1008, based on the predicted position of each joint in the subject pose tree, the system generates a colorized stack of images. As discussed, the colorized stack of images may be generated from heatmaps illustrating the predicted location of a joint in a two-dimensional space, and the colorized stack of images may include images representing joint motion along an X-Y axis, joint motion along a Y-Z axis, and joint motion along an X-Z axis.

At block 1010, the system classifies the predicted pose. At block 1012, the system determines a motion intent based on the classification of the predicted pose.

In some aspects, the use of probability distributions generated by a probabilistic model for predicting subject motion may result in increased accuracy of predictions of subject motion. For example, the accuracy of predicted subject motion and joint position may increase from under 20 percent accuracy for predictions generated by a regressive model to over 40 percent accuracy for predictions generated by the probabilistic model described herein given observation of 20 percent of a sequence of human motion. Because the accuracy of predicted subject motion may be higher for any given amount of observations, the predicted subject motion generated by the probabilistic models described herein may improve forecasting of subject motion and subject intent and thus improve the functioning of autonomous systems that use predictions of subject motion to take action (e.g., autonomous vehicles, robotics systems, still and/or video capture systems, etc.). For example, based on the determined motion intent, a system can control an autonomous vehicle (e.g., apply braking, acceleration, and/or steering inputs to avoid a collision with an observed subject). In another aspect, a system can adjust a focus location of a camera (e.g., adjust focus towards or away from infinity focus or a closest focal distance of a lens coupled to the camera) based on the determined motion intent so that the observed subject remains substantially in focus (e.g., within the circle of confusion) as the object subject moves within the field of view of the camera.

In some aspects, the system can downscale each image of the received set of images to a lower resolution. The additional set of subject pose trees may be generated from the downscaled images. The resolution selected may be a resolution lower than that of the images received set of images that provides sufficient fidelity to allow for joint recognition and generation of subject pose trees from the images.

In some aspects, positions of each joint in the subject pose tree may be predicted on a per-joint basis. For each joint, a probability distribution may be generated. The probability distribution generally represents a likelihood of the joint moving to a position in an image field (e.g., an area captured by one or more cameras in an autonomous system). A system can generate a heatmap from the probability distribution for each of a plurality of dimensions. Different colors in the heatmap may represent different probability scores (or other values indicative of a likelihood that a joint is located at a particular location) for a particular position of the joint in each of the plurality of dimensions.

In some aspects, the colorized stack of images representing the predicted pose at the future point in time may be generated on a per-joint basis. For each joint, the joint may be colorized based on the generated heatmaps. Colorization of the joint may be performed within a plurality of three-dimensional tensors. The colorized joints may be stacked to represent a sequence of probable joint motion. In some aspects, the plurality of three-dimensional tensors may include a first tensor representing an x-y coordinate plane in three-dimensional space, a second tensor representing a y-z coordinate plane in three-dimensional space; and a third tensor representing an x-z coordinate plane in three-dimensional space.

In some aspects, determining the motion intent based on a classification of the predicted pose may include evaluating predicted poses for a plurality of future points in time.

Figure 11:
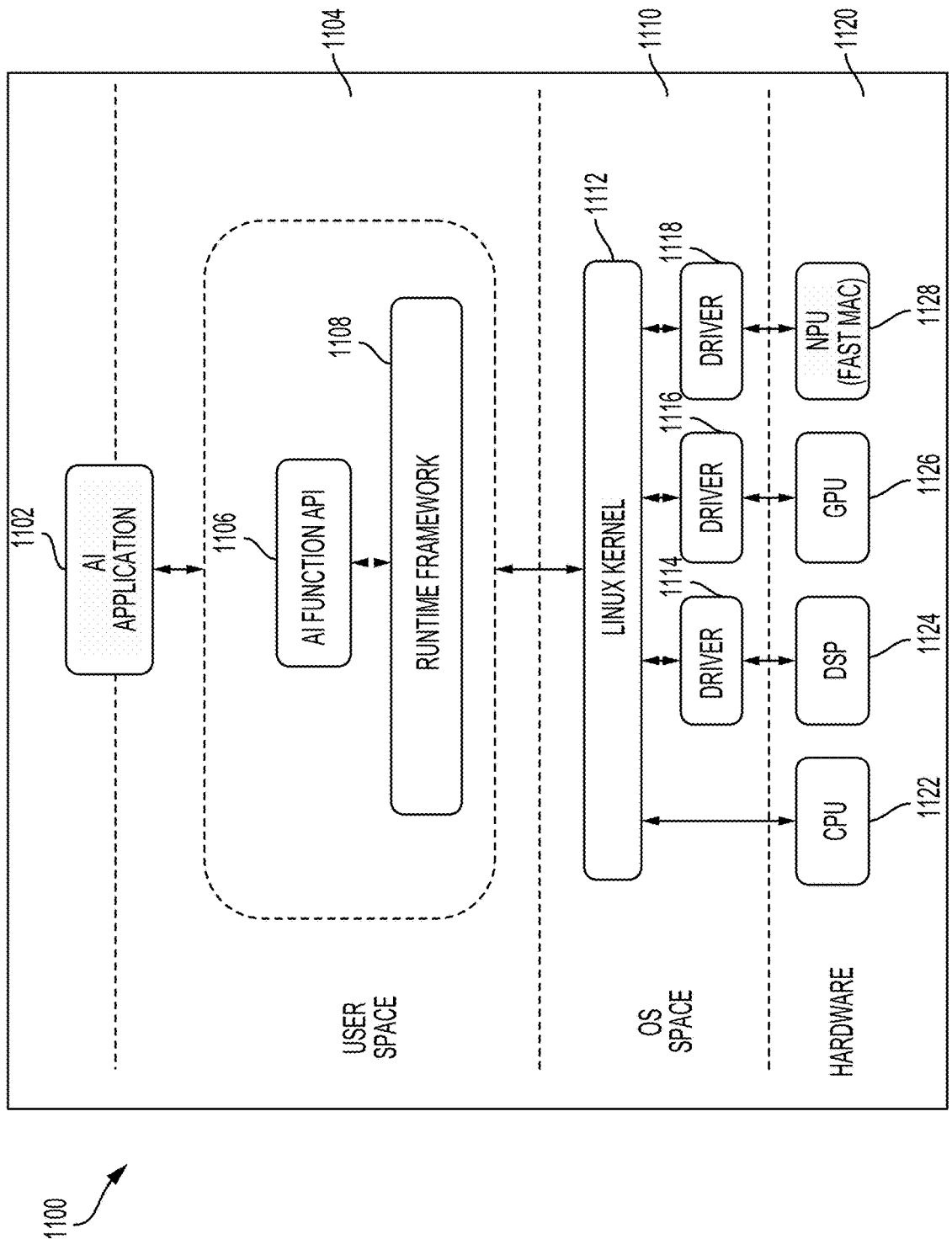
FIG. 11 shows a block diagram illustrating an exemplary software architecture for modularizing artificial intelligence (AI) functions, according to aspects presented herein.

FIG. 11 is a block diagram illustrating an exemplary software architecture 1100 that may modularize artificial intelligence (AI) functions. Using the architecture, applications may be designed that may cause various processing blocks of an SOC 1120 (for example a CPU 1122, a DSP 1124, a GPU 1126, and/or an NPU 1128) to support a parallel MC dropout function/procedure for run-time operation of an AI application 1102, according to aspects of the present disclosure.

The AI application 1102 may be configured to call functions defined in a user space 1104 that may, for example, provide for the detection and recognition of a scene indicative of the location in which the device currently operates. The AI application 1102 may, for example, configure a microphone and a camera differently depending on whether the recognized scene is an office, a lecture hall, a restaurant, or an outdoor setting such as a lake. The AI application 1102 may make a request to compiled program code associated with a library defined in an AI function application programming interface (API) 1106. This request may ultimately rely on the output of a deep neural network configured to provide an inference response based on video and positioning data, for example.

A run-time engine 1108, which may be compiled code of a runtime framework, may be further accessible to the AI application 1102. The AI application 1102 may cause the run-time engine, for example, to request an inference at a particular time interval or triggered by an event detected by the user interface of the application. When caused to provide an inference response, the run-time engine may in turn send a signal to an operating system in an operating system (OS) space 1110, such as a Linux Kernel 1112, running on the SOC 1120. The operating system, in turn, may cause an MC dropout function to be performed on the CPU 1122, the DSP 1124, the GPU 1126, the NPU 1128, or some combination thereof. The CPU 1122 may be accessed directly by the operating system, and other processing blocks may be accessed through a driver, such as a driver 1114, 1116, or 1118 for, respectively, the DSP 1124, the GPU 1126, or the NPU 1128. In the exemplary example, the deep neural network may be configured to run on a combination of processing blocks, such as the CPU 1122, the DSP 1124, and the GPU 1126, or may be run on the NPU 1128.

The various illustrative circuits described in connection with aspects described herein may be implemented in or with an integrated circuit (IC), such as a processor, a digital signal processor (DSP), an application-specific integrated circuit (ASIC), a field-programmable gate array (FPGA), or other programmable logic device. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is also noted that the operational steps described in any of the exemplary aspects herein are described to provide examples. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flow diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The present disclosure is provided to enable any person skilled in the art to make or use aspects of the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

The invention claimed is:

1. A method for predicting subject motion, comprising:
receiving training data comprising a set of subject pose trees associated with a sequence of images, wherein each subject pose tree indicates a location along an axis of an image in the sequence of images at which each of a plurality of joints of a subject is located;
processing the received training data in a convolutional neural network to generate a trained probabilistic model for predicting joint distribution and subject motion based on density estimation; and
deploying the trained probabilistic model to a computer vision system, wherein the trained probabilistic model is configured to generate a probability distribution for each joint indicating a likelihood that the joint will be located at each location along the axis.

2. The method of claim 1, wherein the convolutional neural network comprises an autoregressive deep neural network.

3. The method of claim 1, wherein processing the received training data comprises:
generating, from each subject pose tree, a two-dimensional matrix having a plurality of columns, wherein each column of the two-dimensional matrix represents a sequence of joint dependencies from a first joint to an $n^{th}$ joint and preserves joint dependencies identified in the subject pose tree; and
generating the trained probabilistic model based on the generated two-dimensional matrices.

4. The method of claim 3, wherein each element in the two-dimensional matrix represents the location along the axis of a joint in the plurality of joints of the subject.

5. The method of claim 3, wherein a joint dependency in the sequence of joint dependencies defines a parent joint and an immediately adjacent joint dependent on the parent joint.

6. The method of claim 1, wherein the convolutional neural network is configured to examine a position of a joint at a plurality of time points prior to a given point in time and examine the position of the joint and a position of its parent joint at the given point in time to learn spatial and temporal dependencies of the joint and the parent joint.

7. The method of claim 1, wherein the convolutional neural network comprises a stack of three-dimensional convolutional layers including a first convolutional layer masked against input data points and one or more other convolutional layers following the first convolutional layer that are unmasked against the input data points.

8. The method of claim 7, wherein the first convolutional layer and the other convolutional layers are configured to use a kernel representing possible directions in which a joint in the subject pose tree can move.

9. The method of claim 1, further comprising:
receiving a set of images for use in predicting future subject motion;
generating time-sequence data for the received set of images comprising two-dimensional tensors generated from an additional set of subject pose trees for the received set of images representing positions of joints in an image of the set of images and preserving dependencies of joints in the subject pose tree;
predicting, for one or more future points in time, a position of each joint in the subject pose tree by applying the trained probabilistic model to the time-sequence data, wherein the predicted position of each joint is based on a probability distribution generated by the trained probabilistic model;
based on the predicted position of each joint in the subject pose tree, generating a colorized stack of images;
determining a predicted pose at a future point in time based on the colorized stack of images;
classifying the predicted pose; and
determining a motion intent based on the classification of the predicted pose.

10. The method of claim 9, further comprising:
controlling an autonomous vehicle based on the determined motion intent.

11. The method of claim 9, further comprising:
adjusting a focus location of a camera based on the determined motion intent.

12. The method of claim 9, further comprising:
downscaling each image of the received set of images to a lower resolution, wherein the additional set of subject pose trees is generated from the downscaled images.

13. The method of claim 9, wherein predicting the position of each joint in the subject pose tree comprises:
for each joint:
generating a probability distribution representing a likelihood of the joint moving to a position in an image field; and
generating a heatmap from the probability distribution for each of a plurality of dimensions, wherein different colors in the heatmap represent different probability scores for a particular position of the joint in each of the plurality of dimensions.

14. The method of claim 13, wherein generating the colorized stack of images representing the predicted pose at the future point in time comprises:
for each joint:
colorizing the joint based on the generated heatmaps within a plurality of three-dimensional tensors; and
stacking the colorized joints to represent a sequence of probable joint motion.

15. The method of claim 14, wherein the plurality of three-dimensional tensors comprises:
a first tensor representing an x-y coordinate plane in three-dimensional space;
a second tensor representing a y-z coordinate plane in three-dimensional space; and
a third tensor representing an x-z coordinate plane in three-dimensional space.

16. The method of claim 9, wherein determining the motion intent based on a classification of the predicted pose comprises evaluating predicted poses for a plurality of future points in time.

17. An apparatus for predicting subject motion, comprising:
at least one processor configured to:
receive training data comprising a set of subject pose trees associated with a sequence of images, wherein each subject pose tree indicates a location along an axis of an image in the sequence of images at which each of a plurality of joints of a subject is located,
process the received training data in a convolutional neural network to generate a trained probabilistic model for predicting joint distribution and subject motion based on density estimation, and
deploy the trained probabilistic model to a computer vision system, wherein the trained probabilistic model is configured to generate a probability distribution for each joint indicating a likelihood that the joint will be located at each location along the axis; and
a memory coupled to the processor.

18. The apparatus of claim 17, wherein the convolutional neural network comprises an autoregressive deep neural network.

19. The apparatus of claim 17, wherein the at least one processor is configured to process the received training data by:
generating, from each subject pose tree, a two-dimensional matrix having a plurality of columns, wherein each column of the two-dimensional matrix represents a sequence of joint dependencies from a first joint to an $n^{th}$ joint and preserves joint dependencies identified in the subject pose tree; and
generating the trained probabilistic model based on the generated two-dimensional matrices.

20. The apparatus of claim 17, wherein the convolutional neural network is configured to examine a position of a joint at a plurality of time points prior to a given point in time and examine the position of the joint and a position of its parent joint at the given point in time to learn spatial and temporal dependencies of the joint and the parent joint.

21. The apparatus of claim 17, wherein the convolutional neural network comprises a stack of three-dimensional convolutional layers including a first convolutional layer masked against input data points and one or more other convolutional layers following the first convolutional layer that are unmasked against the input data points.

22. The apparatus of claim 17, wherein the at least one processor is further configured to:

receive a set of images for use in predicting future subject motion;
generate time-sequence data for the received set of images comprising two-dimensional tensors generated from an additional set of subject pose trees for the received set of images representing positions of joints in an image of the set of images and preserving dependencies of joints in the subject pose tree;
predict, for one or more future points in time, a position of each joint in the subject pose tree by applying the trained probabilistic model to the time-sequence data, wherein the predicted position of each joint is based on a probability distribution generated by the trained probabilistic model;
based on the predicted position of each joint in the subject pose tree, generate a colorized stack of images;
determine a predicted pose at a future point in time based on the colorized stack of images;
classify the predicted pose; and
determine a motion intent based on the classification of the predicted pose.

23. The apparatus of claim 22, wherein the at least one processor is configured to predict the position of each joint in the subject pose tree by:
for each joint:
generating a probability distribution representing a likelihood of the joint moving to a position in an image field; and
generating a heatmap from the probability distribution for each of a plurality of dimensions, wherein different colors in the heatmap represent different probability scores for a particular position of the joint in each of the plurality of dimensions.

24. The apparatus of claim 23, wherein the at least one processor is configured to generate the colorized stack of images representing the predicted pose at the future point in time by:
for each joint:
colorizing the joint based on the generated heatmaps within a plurality of three-dimensional tensors; and
stacking the colorized joints to represent a sequence of probable joint motion.

25. The apparatus of claim 24, wherein the plurality of three-dimensional tensors comprises:
a first tensor representing an x-y coordinate plane in three-dimensional space;
a second tensor representing a y-z coordinate plane in three-dimensional space; and
a third tensor representing an x-z coordinate plane in three-dimensional space.

26. The apparatus of claim 22, wherein the at least one processor is configured to determine the motion intent based on the classification of the predicted pose by evaluating predicted poses for a plurality of future points in time.

27. An apparatus for predicting subject motion, comprising:
means for receiving training data comprising a set of subject pose trees associated with a sequence of images, wherein each subject pose tree indicates a location along an axis of an image in the sequence of images at which each of a plurality of joints of a subject is located;
means for processing the received training data in a convolutional neural network to generate a trained probabilistic model for predicting joint distribution and subject motion based on density estimation; and
means for deploying the trained probabilistic model to a computer vision system, wherein the trained probabilistic model is configured to generate a probability distribution for each joint indicating a likelihood that the joint will be located at each location along the axis.

28. The apparatus of claim 27, wherein the means for processing the received training data comprises:
means for generating, from each subject pose tree, a two-dimensional matrix having a plurality of columns, wherein each column of the two-dimensional matrix represents a sequence of joint dependencies from a first joint to an $n^{th}$ joint and preserves joint dependencies identified in the subject pose tree; and
means for generating the trained probabilistic model based on the generated two-dimensional matrices.

29. The apparatus of claim 27, further comprising:
means for receiving a set of images for use in predicting future subject motion;
means for generating time-sequence data for the received set of images comprising two-dimensional tensors generated from an additional set of subject pose trees for the received set of images representing positions of joints in an image of the set of images and preserving dependencies of joints in the subject pose tree;
means for predicting, for one or more future points in time, a position of each joint in the subject pose tree by applying the trained probabilistic model to the time-sequence data, wherein the predicted position of each joint is based on a probability distribution generated by the trained probabilistic model;
means for generating a colorized stack of images based on the predicted position of each joint in the subject pose tree;
means for determining a predicted pose at a future point in time based on the colorized stack of images;
means for classifying the predicted pose; and
means for determining a motion intent based on the classification of the predicted pose.

30. A non-transitory computer-readable medium having instructions stored thereon which, when executed by at least one processor, perform an operation for predicting subject motion, the operation comprising:
receiving training data comprising a set of subject pose trees associated with a sequence of images, wherein each subject pose tree indicates a location along an axis of an image in the sequence of images at which each of a plurality of joints of a subject is located;
processing the received training data in a convolutional neural network to generate a trained probabilistic model for predicting joint distribution and subject motion based on density estimation; and
deploying the trained probabilistic model to a computer vision system, wherein the trained probabilistic model is configured to generate a probability distribution for each joint indicating a likelihood that the joint will be located at each location along the axis.

* * * * *